Patented Apr. 18, 1950

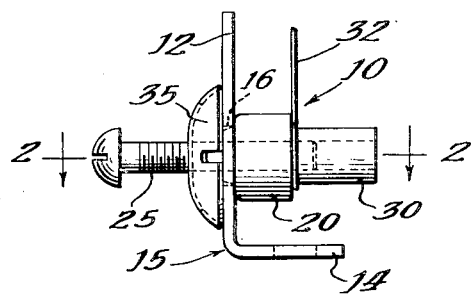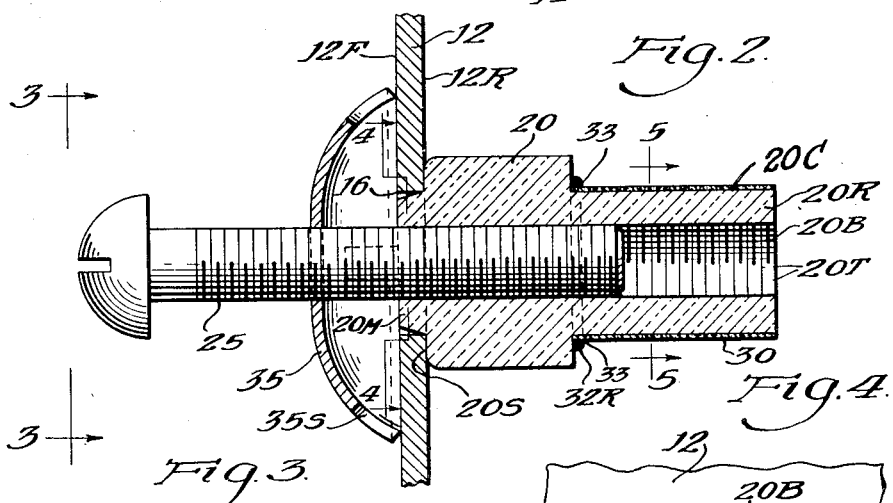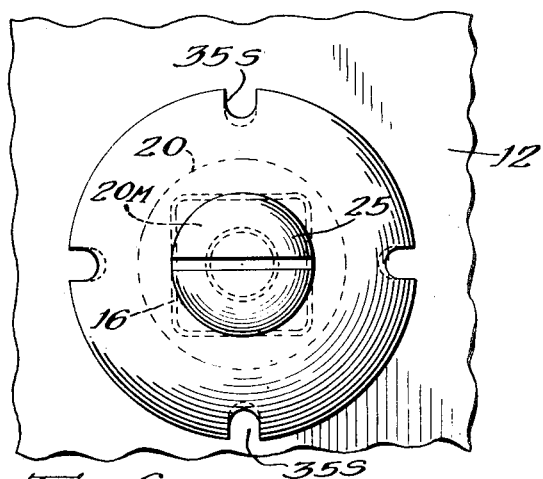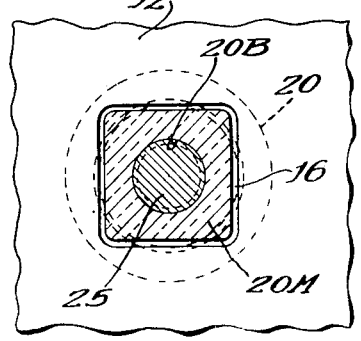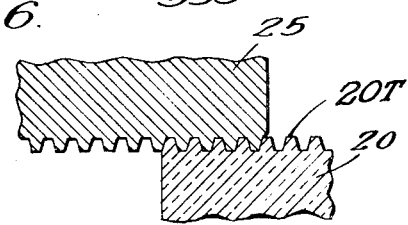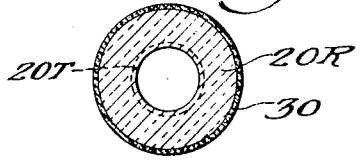

2,504,758

UNITED STATES PATENT OFFICE 2,504,758

VARIABLE CAPACITOR

Edwin P. Thias, Hollywood, and Warren W. White, Altadena, Calif., assignors to Standard Coil Products Co., Inc., Chicago, Ill., a corporation of Illinois Application June 5, 1948, Serial No. 31,357

1 Claim. (Cl. 175—41.5)

This invention relates to capacitors and particularly to small adjustable capacitors of the general type utilized in radio, television and other high frequency electrical circuits.

In adjustable capacitors that are to be used for trimming or like purposes in radio, television or other high frequency electrical work, it is desirable that the adjustments of the effective capacity be varied along a smooth curve in response to adjustments of the adjustable member of the capacitor, and to enable this to be accomplished with a structure that is extremely simple and economical in form is the primary object of the present invention. More specifically, it is an object of the present invention to simplify the manufacture and mounting of adjustable capacitors, and a related object is to enable the mounting means of such a capacitor to cooperate with the other elements of the capacitor to maintain a uniformity of relationship between the relatively adjustable elements of the capacitor.

Capacitors of the kind to which this invention relates are quite frequently used in circuit locations wherein one side of the capacitor is at ground potential as represented by the chassis of a radio, television or like apparatus, and it is therefore a further object of the invention to enable the mounting of the capacitor to readily and easily establish such ground connection, and a related object is to accomplish this in such a way that an ungrounded mounting may be readily attained where this is desirable.

Other and further objects of the present invention will be apparent from the following description and claims and are illustrated in the accompanying drawings which, by way of illustration, show a preferred embodiment and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claim.

In the drawings:

Fig. 1 is a side elevational view of an adjustable capacitor embodying the features of the invention;

Fig. 2 is a horizontal sectional view at an enlarged scale and taken along the line 2—2 of Fig. 1;

Fig. 3 is a front or outside elevational view taken from line 3—3 of Fig. 2;

Fig. 4 is a fragmentary sectional view taken substantially along the line 4—4 of Fig. 2;

Fig. 5 is a sectional view taken along the line 5—5 of Fig. 2; and

Fig. 6 is an enlarged fragmentary view illustrating the form of the cooperating screw threads utilized in the capacitor.

For purposes of disclosure the invention is herein illustrated as embodied in an adjustable capacitor 10 adapted either for bracket or chassis mounting and which may be readily and easily mounted on a support that may be simply and easily formed to adapt the same for such mounting. As herein shown, a support plate 12 is illustrated as being a part or arm of an angle bracket 15, the other arm 14 in such an instance constituting a fastening or mounting arm. Whereas we have illustrated our adjustable capacitor as being mounted on a bracket 15, it should be understood that the bracket 15 represents any metal part of the chassis and not necessarily a separate bracket to be mounted thereon. In whatever form the mounting or support plate 12 may be embodied, it is prepared for mounting of the capacitor 10 of the present invention merely by forming a non-circular opening 16 therein, as shown in Fig. 4, and the capacitor 10 has an elongated rigid body 20 which at one end thereof has an integral and non-circular boss 20M projecting axially therefrom so as to be substantially complementary to the plate opening 16. The body 20 is considerably wider than the boss 20M, and thus an end shoulder 20S is formed on the body about the boss 20M, and this shoulder or end face 20S abuts one face 12R of the plate 12 when the boss 12M is extended into the opening 16. The body 20 is secured in this position on the plate 12 as will be described hereinafter.

The body 20 is made from a rigid material having a high dielectric constant, such for example, as a ceramic material, and a longitudinal bore 20B is formed axially through the body 20 so as to open through the end of the mounting boss 20M. The bore 20B is formed with internal screw threads 20T to receive a threaded screw 25 which constitutes one plate or element of the capacitor, as will hereinafter appear, the other plate of the capacitor being afforded by a metallic sleeve 30 which surrounds an outer surface 20C formed on the body 20 in a coaxial relation to the bore 20B. This surface 20C is formed on a portion 20R of the body 20 and extends from the other end of the body 20 for a substantial distance. While the surface 20C and the sleeve 30 may be of many different forms insofar as both longitudinal and transverse cross sectional form may be concerned, these elements are in the present instance cylindrical in form, since this relationship to the screw 25 has been found to give a proper curve in respect to adjustment of the capacitor for use in television pre-selector units and the like.

The sleeve 30 is preferably formed as a silver coating which may be applied to the cylindrical surface 20C and then fired so as to obtain an intimate bond of the sleeve 30 with the surface 20C of the body 20, and the effectiveness of the portion 20R as the dielectric between the sleeve 30 and the screw 25 of the capacitor is thereby increased. A lead wire 32 is electrically connected to the sleeve 30, and this may be accomplished in a simple manner by forming a ring 32R on the lead wire. This ring 32R is put in position about the sleeve 30, and against the shoulder that in the present instance is formed at the left end of the portion 20R, and this ring is soldered at 33 to the sleeve 30 while engaged with the shoulder so as to form a good electrical and mechanical connection.

The screw 25 under the present invention serves not only as the adjustable plate or element of the capacitor 10, but also as an element of the mounting means, and to this end, a concave spring nut 35 is threaded onto the screw 25 so that this spring nut may engage the other surface 12F of the plate 12 when the screw 25 is threaded into the bore 20B, as shown in Fig. 2. The spring nut 35 has radial slots 35S formed at spaced points about its edge so that this edge portion is in effect divided into a plurality of spring arms. In such mounting operation the screw 25 is first threaded for a substantial distance into the bore 20B so as to be firmly anchored therein. The spring nut 35 is then advanced on the screw 25 until it engages the face 12F, and this tightening is continued until a substantial spring tension is built up in the nut 35 tending to urge the screw 25 to the left in Fig. 2. Thus the spring nut 35 acts resiliently through the screw 25 to hold the body 20 firmly in place. Moreover, the edges of the spring nut 35 frictionally engage the surface 12F so that the screw 25 may be rotatively adjusted, it being noted that the boss 20M interlocks with the opening 16 to similarly hold the body 20 against rotation. Hence the screw 25 may be longitudinally adjusted relative to the sleeve 30, thereby to enable the capacity of the capacitor to be adjustably varied by rotative actuation of the screw 25.

It will be observed that the constantly acting yielding force applied to the screw 25 serves to take up the backlash in the screw so as to thereby facilitate accurate or fine adjustment of the screw. This yielding force on the screw 25 also functions in maintaining the adjusted setting of the screw, and contributes materially to the attainment of a smooth curve insofar as adjustment of the capacitor may be concerned. Another important function of the spring nut 35 is attained through cooperation with the angular cross sectional form of the threads 20T, Fig. 6, which may be of the Acme type or any other type having sloping sides. Thus by the application of the constant endwise yielding force, as by the spring nut 35, the sloping sides of the threads 20T cooperate with a camming action with the complemental threads of screw 25 so as to tend to maintain a substantially constant location of the screw 25 with relation to the bore 20B even if the threads on the screw 20 and the threads on the body 25 mesh relatively loosely. The bore 20B need not be perfectly concentric with the sleeve 30, and no high degree of tolerance or accuracy need be held between the thread 20T and the screw 25 because the screw 25 is axially biased by the spring nut 35 so that there is a constant and frictional contact between the screw 25 and the threads 20T at all times. The axial bias together with the co-efficient of friction between the materials maintains the screw 25 in a fixed position once it is set and because of the angular face of the threads 20T the shaft of the screw 25 tends to center in the bore defined by the threads 20T.

The importance of such an arrangement will be recognized when it is realized that the dielectric constant of air is one and the dielectric constant of the ceramic material used may run in excess of 30; therefore, a variation of .001" air gap varies the capacitor the same as .030" difference in the ceramic material.

In the form illustrated in the present drawings, the screw 25 is effectually connected to the plate 12 in an electrical sense so that the screw 25 may constitute the grounded side of the capacitor in many types of high frequency circuits. It will be evident, of course, that this electrical connection for the screw 25 is afforded by the engagement of the edges of the spring nut 35 with plate 12, and where an ungrounded condition is desired in respect to the screw 25, this can readily be attained through the provision of an insulating layer such as a washer between the spring nut 35 and the mounting plate 12.

From the foregoing description it will be apparent that the present invention affords a variable capacitor that is extremely simple and economical in form, and the capacitor that is thus afforded is of such a character that it may be readily and easily mounted in the desired position of use. An important consideration in this regard is that the mounting of the capacitor on a bracket or chassis element requires nothing more than the provision of a simple mounting opening that may be formed in the stamping operation in course of manufacture of the bracket or chassis part.

The capacitor afforded by the present invention enables a smooth curve to be attained insofar as adjustment of the capacity of the capacitor may be concerned, and the provision of means for applying a yielding axial force to the screw of the capacitor serves to take up backlash and maintain the screw in any adjusted position in which it may be set.

Thus, while we have illustrated and described the preferred embodiment of our invention, it is to be understood that this is capable of variation and modification and we therefore do not wish to be limited to the precise details set forth, but desire to avail ourselves of such changes and alterations as fall within the purview of the following claim.

We claim:

A variable capacitor comprising a dielectric body having means thereon defining an outer conductive surface and being formed with an axial threaded bore, a conductive shaft threaded in said bore and having a portion extending outwardly thereof beyond one end of said body whereby said shaft may be axially adjusted in said bore, said end of said body having a non-circular boss extending axially therefrom and a mounting shoulder on said body, a mounting element having a non-circular aperture in which said non-circular boss is disposed to prevent relative rotation therebetween with said shoulder engaging one face of said mounting element, a conductive axial biasing member threaded to the projecting portion of said shaft and extending laterally of said shaft, the laterally extending portions of said biasing member being resiliently distortable whereby to engage the opposite face of said mounting element to hold said body, support element and shaft in assembled relationship and to bias said shaft in an axial direction relative to said body.

EDWIN P. THIAS.
WARREN W. WHITE.

REFERENCES CITED

The following references are of record in the file of this patent:

UNITED STATES PATENTS

| Number | Name | Date |
|---|---|---|
| 2,102,098 | Sickles | Dec. 14, 1937 |
| 2,149,702 | Maris | Mar. 7, 1939 |
| 2,335,205 | Zepp | Nov. 23, 1943 |
| 2,474,259 | Lapham | June 28, 1949 |
| 2,477,688 | Dyer | Aug. 2, 1949 |

FOREIGN PATENTS

| Number | Country | Date |
|---|---|---|
| 647,016 | France | July 23, 1928 |